US012646417B1

(12) United States Patent
Fieldman

(10) Patent No.: US 12,646,417 B1
(45) Date of Patent: Jun. 2, 2026

(54) ARTIFICIAL INTELLIGENCE ASSISTED ORAL EXAMINATION

(71) Applicant: CURIOXR, INC., Gainesville, FL (US)

(72) Inventor: Ethan Fieldman, Gainesville, FL (US)

(73) Assignee: CURIOXR, INC., Gainesville, FL (US)

( * ) Notice: Subject to any disclaimer, the term of this patent is extended or adjusted under 35 U.S.C. 154(b) by 0 days.

(21) Appl. No.: 19/290,560

(22) Filed: Aug. 5, 2025

(51) Int. Cl.
*G09B 7/06* (2006.01)

(52) U.S. Cl.
CPC ...................................... *G09B 7/06* (2013.01)

(58) Field of Classification Search
CPC ........................................................ G09B 7/06
USPC ........................................................ 434/362
See application file for complete search history.

(56) References Cited

U.S. PATENT DOCUMENTS

| | | | | | |
|---|---|---|---|---|---|
| 11,501,654 | B2 * | 11/2022 | D'Helon | ................... | G09B 7/02 |
| 11,990,059 | B1 * | 5/2024 | Fieldman | ................ | G06T 11/00 |
| 12,211,511 | B1 * | 1/2025 | Sandrew | ................. | G10L 17/14 |
| 2014/0030686 | A1 * | 1/2014 | Stambaugh | .............. | G09B 5/00 |
| | | | | | 434/322 |
| 2021/0201688 | A1 * | 7/2021 | Agarwal | ................... | G09B 7/04 |
| 2022/0375464 | A1 * | 11/2022 | Mukhi | ................. | G09B 19/003 |
| 2023/0068338 | A1 * | 3/2023 | Ramnani | ................. | G06F 40/35 |
| 2025/0039004 | A1 * | 1/2025 | Razavi | ................... | G06N 3/045 |

\* cited by examiner

*Primary Examiner* — Dmitry Suhol
*Assistant Examiner* — Alyssa N Brandley
(74) *Attorney, Agent, or Firm* — Polsinelli PC

(57) ABSTRACT

Embodiments described herein involve converting written assessments into oral assessments, which may be conversational in nature. The oral assessments may be better at determining the knowledge of an assessee. Additionally, the oral assessments are less vulnerable to academic dishonesty. Embodiments also generate an answer form similar to an answer form that would be used with the written assessment, thereby allowing assessors to seamlessly continue using their practiced assessment methods. In embodiments, a computer-implemented method of examination involves processing a written assessment through a machine learning model to generate an oral assessment, which is then transmitted to an assessee. The assessee responds to the oral assessment, and the response is analyzed using the machine learning model to determine one or more answers to the written assessment. A completed answer form to the written assessment is generated using these answers.

21 Claims, 4 Drawing Sheets

PROCESS A WRITTEN ASSESSMENT THROUGH A MACHINE LEARNING MODEL TO GENERATE AN ORAL ASSESSMENT 102

TRANSMIT, TO AN ASSESSEE, THE ORAL ASSESSMENT 104

STORE A RESPONSE BY THE ASSESSEE TO THE ORAL ASSESSMENT 106

ANALYZE, USING THE MACHINE LEARNING MODEL, THE RESPONSE TO THE ORAL ASSESSMENT TO DETERMINE ONE OR MORE ANSWERS TO THE WRITTEN ASSESSMENT 108

GENERATE A COMPLETED ANSWER FORM TO THE WRITTEN ASSESSMENT USING THE ONE OR MORE ANSWERS 110

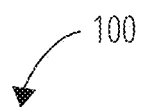

100

PROCESS A WRITTEN ASSESSMENT THROUGH A MACHINE LEARNING MODEL TO GENERATE AN ORAL ASSESSMENT 102

TRANSMIT, TO AN ASSESSEE, THE ORAL ASSESSMENT 104

STORE A RESPONSE BY THE ASSESSEE TO THE ORAL ASSESSMENT 106

ANALYZE, USING THE MACHINE LEARNING MODEL, THE RESPONSE TO THE ORAL ASSESSMENT TO DETERMINE ONE OR MORE ANSWERS TO THE WRITTEN ASSESSMENT 108

GENERATE A COMPLETED ANSWER FORM TO THE WRITTEN ASSESSMENT USING THE ONE OR MORE ANSWERS 110

FIG. 1

XR DEVICE 210

CAMERA 208

ASSESSEE DEVICE 202

ASSESSOR DEVICE 212

PRINTER 214

NETWORK 216

SERVER 204

MACHINE LEARNING ENGINE 218

USER INTERFACE ENGINE 222

ANALYSIS ENGINE 220

DATA STORE 206

307

Sample Data 304

Analysis based on Sample Data 306

Training Data 300

Sample Data

Analysis based on Sample Data

Machine Learning (ML) Engine 302

Machine Learning (ML) Model(S) 301

Validation:
Do the analyses match? 305

Analysis based on Sample Data (e.g., pattern, summaries, deviations, fraud, trends, predictions, pivots, etc.) 303

ARTIFICIAL INTELLIGENCE ASSISTED ORAL EXAMINATION

BACKGROUND

Traditional written assessments, such as multiple-choice, true/false, and short-answer tests, have long been the dominant method for evaluating student knowledge and learning outcomes in educational settings. These assessments offer simplicity in administration and case of grading, particularly when automated. However, they suffer from several well-documented limitations.

First, traditional assessments primarily test rote memorization and recognition rather than deep understanding, critical thinking, or the ability to apply knowledge in novel contexts. Multiple-choice tests, in particular, encourage surface-level learning strategies and often fail to capture a student's reasoning process or conceptual grasp of the subject matter. Short-answer questions, while slightly more open-ended, are still constrained by the format and grading criteria, which may limit their effectiveness in assessing higher-order cognitive skills.

Second, these formats provide limited insight into the student's learning trajectory, problem-solving approach, or metacognitive skills. They offer only a snapshot of performance at a given moment, without capturing how a student arrived at an answer or how they might approach similar problems differently in the future.

Moreover, the rise of generative artificial intelligence (AI) tools—such as large language models (LLMs)—has introduced a new vulnerability to traditional written assessments, particularly when administered in remote or unproctored settings. Students can now use AI systems to automatically generate correct answers, essays, and even justifications for their choices with minimal effort. This undermines the integrity of the testing process, as educators can no longer confidently determine whether the submitted responses reflect the student's own understanding or the output of an AI tool. The issue is further compounded by the growing sophistication of AI systems, which are increasingly able to mimic human writing style and reasoning patterns, making AI-assisted cheating more difficult to detect.

These shortcomings highlight a need for alternative assessment methods that are more resilient to academic dishonesty, particularly in the digital age, and that more accurately measure a student's genuine understanding, reasoning abilities, and learning progress. These and other needs are addressed by embodiments described herein.

BRIEF SUMMARY

Embodiments described herein involve converting written assessments into oral assessments, which may be conversational in nature. The oral assessments may be better at determining the knowledge of an assessee. Additionally, the oral assessments are less vulnerable to academic dishonesty. Embodiments also generate an answer form similar to an answer form that would be used with the written assessment, thereby allowing assessors to seamlessly continue using their practiced assessment methods.

In embodiments, a computer-implemented method of examination involves processing a written assessment through a machine learning model to generate an oral assessment, which is then transmitted to an assessee. The assessee responds to the oral assessment, and the response is analyzed using the machine learning model to determine one or more answers to the written assessment. A completed answer form to the written assessment is generated using these answers.

In embodiments, a computer program or system that performs methods is described, which includes a machine learning model, one or more processors, and a non-transitory computer-readable medium storing the instructions. The program or system processes a written assessment, generates an oral assessment, transmits it to an assessee, stores their response, and uses machine learning to analyze the response and generate completed answers.

TERMS

"Educational assessment" includes a structured activity designed to evaluate student learning, knowledge acquisition, and/or skill development by measuring academic progress and understanding through systematic evaluation methods. These assessments include a range of evaluation formats such as examinations that test recall and comprehension under timed or untimed conditions, written assignments that demonstrate research and analytical abilities, essays that evaluate critical thinking and communication skills, practical demonstrations, projects, quizzes, presentations, and performance-based tasks. Educational assessments serve multiple purposes: they provide feedback to both students and educators about learning effectiveness, inform instructional decisions and curriculum improvements, measure achievement against established learning objectives, and often contribute to formal grading and certification processes. Whether formative (providing ongoing feedback during learning) or summative (offering final evaluation of learning outcomes), these structured activities utilize various formats such as multiple-choice questions, short-answer responses, extended written work, oral examinations, and hands-on tasks to comprehensively evaluate student competency across different subjects and skill areas, ultimately supporting the educational goal of documenting and improving student learning outcomes through systematic measurement and evaluation. An educational assessment may be offered outside of a formal educational institution.

"Machine learning model" can refer to a software module configured to be run on one or more processors to provide a classification or numerical value of a property of one or more samples. An ML model can be generated using sample data (e.g., training data) to make predictions on test data. One example is an unsupervised learning model. Another example type of model is supervised learning that can be used with embodiments of the present disclosure. Example supervised learning models may include different approaches and algorithms including analytical learning, statistical models, artificial neural network, backpropagation, boosting (meta-algorithm), Bayesian statistics, case-based reasoning, decision tree learning, inductive logic programming, Gaussian process regression, genetic programming, group method of data handling, kernel estimators, learning automata, learning classifier systems, minimum message length (decision trees, decision graphs, etc.), multilinear subspace learning, naïve Bayes classifier, maximum entropy classifier, conditional random field, nearest neighbor algorithm, probably approximately correct learning (PAC) learning, ripple down rules, a knowledge acquisition methodology, symbolic machine learning algorithms, subsymbolic machine learning algorithms, minimum complexity machines (MCM), random forests, ensembles of classifiers, ordinal classification, data pre-processing, handling imbalanced datasets, statistical relational learning, or Proaftn, a multicriteria classification algorithm. The model may include linear regression, logistic regression, deep recurrent neural network (e.g., long short term memory, LSTM), hidden Markov model (HMM), linear discriminant analysis (LDA), k-means clustering, density-based spatial clustering of applications with noise (DBSCAN), random forest algorithm, support vector machine (SVM), or any model described herein. Supervised learning models can be trained in various ways using various cost/loss functions that define the error from the known label (e.g., least squares and absolute difference from known classification) and various optimization techniques, e.g., using backpropagation, steepest descent, conjugate gradient, and Newton and quasi-Newton techniques.

"Natural language processor" (NLP) may refer to a computational system that enables computers to understand, interpret, and generate human language in a meaningful and contextually appropriate manner. These systems employ algorithms, models, and linguistic rules to analyze text and speech data, extracting semantic meaning, identifying grammatical structures, and recognizing patterns within natural language communications. Natural language processors may perform a wide range of functions including text parsing, sentiment analysis, language translation, speech recognition, entity extraction, summarization, and/or conversational response generation, utilizing techniques such as tokenization, part-of-speech tagging, syntactic parsing, and/or neural network architectures like transformers and recurrent neural networks. By processing linguistic data and learning from complex language patterns, these systems can handle ambiguity, context dependencies, and cultural nuances inherent in human communication, enabling applications such as chatbots, virtual assistants, automated translation services, content analysis tools, and/or intelligent document processing systems.

"Extended reality device" (XR device) refers to technological platforms that encompass the full spectrum of immersive digital experiences, including Virtual Reality (VR), Augmented Reality (AR), and Mixed Reality (MR) systems. These devices utilize advanced sensors, displays, processors, and/or tracking technologies to create seamless interactions between users and digital content, whether by completely replacing the physical environment with computer-generated worlds, overlaying digital information onto real-world surroundings, or blending virtual and physical elements into hybrid experiences. XR devices range from head-mounted displays and smart glasses to handheld controllers and haptic feedback systems, working together to provide users with intuitive ways to visualize, manipulate, and interact with three-dimensional digital content across various applications including education, training, entertainment, healthcare, and professional collaboration.

"Mixed reality device" or MR device refers to a device that merges a real-world environment and a computer-generated one. Computer-generated images, graphics, or text may be superimposed over a real-world environment. In some embodiments, a mixed reality device may include image capture ability, speech interpretation, and computer-generated voiceovers. Mixed reality devices may include a camera, a speaker (which may be directed to only the user), a microphone, and/or a display. Mixed reality devices may have the form of a headset or glasses. Examples of mixed reality devices may include Meta Quest headsets, Apple Vision Pro headsets, Ray-Ban Meta glasses, Meta Orion AI Glasses, or other suitable devices. In some embodiments, a mixed reality device may be a combination of two or more separated components. For example, a mixed reality device may include a camera and a separate display. The camera and the display may be in communication with each other through Bluetooth, cellular, WiFi, or other suitable means. As an example, the mixed reality device may include a Ray-Ban Meta glasses (e.g., glasses that do not include a display) and a smartphone. The smartphone may display the captured images from the glasses in real time with graphics superimposed over the images.

"Statistical value" refers to any numerical measure or quantity derived from data analysis that provides meaningful information about a dataset, population, or phenomenon. These values include descriptive statistics such as mean, median, mode, standard deviation, range, and percentile that summarize and describe data characteristics, as well as inferential statistics like p-values, confidence intervals, test statistics, and correlation coefficients that help draw conclusions about relationships, significance, or population parameters. Statistical values serve to transform raw data into interpretable, quantifiable information that researchers and analysts can use for comparison, decision-making, pattern recognition, and drawing evidence-based conclusions about the data they are studying.

"Threshold" or "cutoff" refers to predetermined numbers used in an operation. For example, a cutoff score can refer to a score below which inputs associated with the score are excluded. As another example, a threshold value may be a value above or below which a particular classification applies. Either of these terms can be used in either of these contexts. A cutoff or threshold may be "a reference value" or derived from a reference value that is representative of a particular classification or discriminates between two or more classifications. A cutoff may be predetermined with or without reference to the characteristics of the sample or the subject. A particular value for a cutoff, threshold, reference, etc. can be determined based on a desired accuracy (e.g., a sensitivity and specificity).

"About" or "approximately" can mean within an acceptable error range for the particular value as determined by one of ordinary skill in the art, which will depend in part on how the value is measured or determined, i.e., the limitations of the measurement system. For example, "about" can mean within 1 or more than 1 standard deviation, per the practice in the art. Alternatively, "about" can mean a range of up to 20%, up to 10%, up to 5%, or up to 1% of a given value. Alternatively, particularly with respect to biological systems or processes, the term "about" or "approximately" can mean within an order of magnitude, within 5-fold, and more preferably within 2-fold, of a value. Where particular values are described in the application and claims, unless otherwise stated the term "about" meaning within an acceptable error range for the particular value should be assumed. The term "about" can have the meaning as commonly understood by one of ordinary skill in the art. The term "about" can refer to ±10%. The term "about" can refer to ±5%. Any exact number described herein may be modified with "about" or "approximately."

BRIEF DESCRIPTION OF THE DRAWINGS

To easily identify the discussion of any particular element or act, the most significant digit or digits in a reference number refer to the figure number in which that element is first introduced.

FIG. 1 illustrates a method 100 according to embodiments of the present invention.

DETAILED DESCRIPTION

Figure 2:
FIG. 2 illustrates a system according to embodiments of the present invention.

Embodiments described herein relate to an AI-assisted oral exam platform designed to transform traditional examination methods into interactive conversational assessments. This innovative system aims to enhance the educational assessment process by providing a more engaging and accurate evaluation of a student's knowledge and understanding. Additionally, oral examination is less susceptible to cheating than traditional written assessments. A student determined to cheat on an oral examination would demonstrate clear intent to cheat by training an AI-assisted bot to mimic the voice and face of the student.

The AI-assisted oral exam platform may be equipped with various features and functionalities. The platform may convert traditional exams into conversational oral exams, allowing for a more dynamic interaction between the student and the AI system. The system's real-time processing and feedback capabilities may ensure that students receive immediate and constructive feedback on their performance, enhancing their learning experience. Moreover, the platform may be adapted to various exam formats, including multiple-choice, fill-in-the-blank, and essay questions, making it versatile and applicable across different educational contexts.

The platform may incorporate identity verification through voice recognition, ensuring that the individual taking the exam is indeed the registered student. To maintain the integrity of the examination process, the system may include robust anti-cheating mechanisms that make it difficult for students to impersonate others or use unauthorized assistance. Additionally, the platform may provide real-time feedback systems, offering immediate insights into the student's performance and areas for improvement. Furthermore, the system may integrate with extended reality devices and mixed reality devices, enabling a more immersive and interactive examination experience.

The AI-assisted oral exam platform described herein improves educational assessment technology. By transforming traditional exams into conversational interactions, the system may not only improve the accuracy and engagement of assessments but may also address the prevalent issue of academic dishonesty. The integration of voice recognition and XR environments may further enhance the platform's capabilities, making it a valuable tool for educators and institutions seeking to modernize their assessment methods.

FIG. 1 shows a method 100 of examination. Method 100 may be computer-implemented.

In block 102, method 100 processes a written assessment through a machine learning model to generate an oral assessment. The written assessment may include multiple-choice questions. A written assessment may include one question or a plurality of questions. Each question may have an answer. In some embodiments, each question may have choices for answering the question, with only one choice being the correct answer. For example, a question may have multiple choices A, B, C, D, and E for answering the question. The multiple choices may be 2, 3, 4, 5, or more choices.

A machine learning model can be trained to automatically convert written assessments into oral examination formats by utilizing natural language processing techniques (NLP) and educational assessment frameworks. The training process may involve feeding the model a comprehensive dataset of paired written and oral assessment examples across multiple academic disciplines, where written questions (multiple-choice, short-answer, or essay prompts) are matched with their corresponding oral examination equivalents, including main questions, follow-up probes, and evaluation rubrics. The model may learn to identify key knowledge components, learning objectives, and cognitive levels within written assessments, then may apply transformation rules to generate appropriate oral question sequences that test the same underlying concepts through verbal interaction. During inference, the trained model may analyze input written assessment to extract core learning targets, difficulty levels, and subject matter context, then may automatically generate comprehensive oral examination scripts complete with primary questions, potential follow-up inquiries based on anticipated student responses, suggested probing questions to assess deeper understanding, and/or evaluation criteria tailored to oral delivery. The model can also incorporate adaptive questioning strategies, where subsequent questions may be dynamically adjusted based on student performance patterns and can generate multiple variations of oral assessments from a single written source to prevent memorization and ensure comprehensive evaluation of student knowledge through oral demonstration rather than written response.

The machine learning model may be configured to generate the oral assessment without disclosing a correct answer. In some embodiments, this rule may be hard-coded into the model. In some embodiments, the machine learning model may be trained on datasets where the paired oral examination component does not include the correct answer, and the machine learning model therefore learns that conversion of the written assessment omits providing the correct answer.

The machine learning model may be configured to group questions of the written assessment based on subject matter tested. A written assessment may have included questions on the same or similar topic randomly scattered throughout the test. In an oral assessment, having questions on the same or similar topic grouped together may make the oral assessment more conversational. A machine learning model can automatically group questions from a written assessment by subject matter through topic modeling and text classification techniques. The model may analyze the textual content of each question, identifying key terms, concepts, and semantic patterns that correspond to specific academic domains or subtopics within a broader subject area. Using approaches such as clustering algorithms, latent Dirichlet allocation (LDA), or transformer-based embeddings, the model can detect thematic similarities between questions and organize them into coherent subject-based categories. For example, in a comprehensive science examination, the model could automatically separate questions into distinct groups such as biology, chemistry, physics, and earth science based on vocabulary, conceptual frameworks, and contextual clues present in the question text, enabling educators to ensure balanced coverage across different subject areas and facilitating more targeted assessment of student knowledge within specific domains.

In some embodiments, the machine learning model may generate an oral assessment adapted for an XR device. Such oral assessments may include virtual objects or media to supplement the assessment process. For instance, for a biology test on anatomy, a virtual organism may be displayed for the assessee. The virtual organism may be presented so that the assessee can point to or manipulate (e.g., dissect) the object to identify the anatomy. Questions about anatomy, other biological structures, or physical structures, along with other types of questions, may be difficult to convert to a pure oral assessment. The written form of these questions may include a diagram or photo. A virtual object corresponding to the diagram or photo may be included in the generated oral assessment. In some embodiments, the subject of the diagram or photo may be replaced with a virtual object that may appear three-dimensional in an XR device.

The machine learning model may determine whether to generate virtual objects or other multimedia for an oral assessment on an XR device or a computer. The machine learning model may be configured to convert images or diagrams in the written assessment into virtual objects for the oral assessment. In some embodiments, the machine learning model may generate an oral assessment without any virtual objects for an XR device or other environment. The machine learning model may then answer the oral assessment using only words and no virtual objects. The machine learning model may then generate an efficiency score for the answer based on factors such as accuracy, length, and demonstrated knowledge. If the efficiency score is under a threshold, the machine learning model may modify the oral assessment to include a virtual object. The machine learning model may formulate an answer using the virtual object and generate a new efficiency score. If the new efficiency score is sufficiently improved or above the threshold, then the question may be adapted for including the virtual object. The machine learning model may try different iterations with different virtual objects or combinations of virtual objects.

The oral assessment may also allow the assessee to use certain virtual tools to answer questions. For example, in a dissection test, the assessee may be provided with a virtual scalpel for dissection. As another example, for a test on how an automotive engine works, a virtual wrench may be provided. As another example, a virtual laser pointer may be provided to point to certain objects. A virtual graphing calculator may be provided for a math test. The assessee may have the option to request one or more virtual tools.

In block 104, method 100 transmits, to an assessee, the oral assessment. Transmitting the oral assessment may include presenting questions to the assessee grouped by subject matter tested. Transmitting the oral assessment may include transmitting to a computing device of the assessee, which may be assessee device 202. The computing device may play audio and/or video to present the oral assessment to the assessee. The oral assessment may be delivered using a web browser or a dedicated software application.

In block 106, method 100 stores a response by the assessee to the oral assessment. The response may include an audio component. The response may be stored as a video, with both audio and image. The assessee's computing device may record the response. The response may be stored first on the assessee's computing device. In some embodiments, the response may be contemporaneously transmitted to a server (e.g., server 204), which may store the response on a data store (e.g., data store 206). Method 100 may include storing one or more bookmarks with the response or appended to the response. The one or more bookmarks may correspond to a portion of the response used to determine the one or more answers. For example, a machine learning model may use a portion of the response corresponding to a certain start time and a certain end time to determine the answer to a specific question of the written assessment. The start and/or end time of the response can be bookmarked as corresponding to the answer to the specific question. The response may have permissions set such that the assessee and/or assessor can access the response and the associated bookmarks.

The response may be converted to text for analysis. The conversion may be performed using speech-to-text conversion techniques and tools.

In some embodiments, method 100 may include determining, using the machine learning model, that the response to the written assessment does not correspond to the one or more answers. The machine learning model may be the same machine learning model as the one for processing the written assessment, but there may be a different machine learning engine performing the determining. The machine learning model can determine whether a response to an oral question is incomplete by analyzing the semantic alignment between the question's expected content and the student's actual response using natural language understanding techniques. The model can be trained on datasets of question-answer pairs labeled for completeness, learning to identify key information components that should be present in a comprehensive answer and detecting when critical elements are missing, superficially addressed, or entirely omitted. Through techniques such as semantic similarity scoring, named entity recognition, and concept extraction, the model can compare the student's response against expected answer frameworks to identify gaps in coverage, insufficient detail, or tangential responses that fail to address the core question. Additionally, the model can evaluate response coherence, logical flow, and the presence of supporting evidence or examples that demonstrate true understanding, enabling it to flag responses that may sound plausible but lack the depth or specificity required for a complete answer, thereby triggering appropriate follow-up questions or additional probing to elicit more comprehensive responses.

Method 100 may include generating, by the machine learning model, one or more follow-up questions to the assessee to elicit a second response corresponding to the one or more answers. A machine learning model can generate targeted follow-up questions by analyzing gaps or weaknesses identified in a student's initial response and dynamically creating probes designed to elicit more complete or deeper understanding. The model may leverage the incomplete response analysis to determine which specific knowledge components were missing, superficially addressed, or incorrectly stated, then generates contextually appropriate follow-up questions that directly target these deficiencies. Using transformer-based language generation techniques trained on educational dialogue patterns, the model can create various types of follow-up questions including clarification requests ("Can you explain what you mean by . . . "), elaboration prompts ("Tell me more about how X relates to Y"), specific detail queries ("What are the key steps involved in this process?"), and application-based questions that test understanding in different contexts. The model can also adapt the complexity and phrasing of follow-up questions based on the student's demonstrated knowledge level and communication style, ensuring that the probing questions are appropriately challenging while remaining accessible, ultimately creating a more personalized and thorough assessment experience that reveals the true extent of student comprehension.

In block 108, method 100 analyzes, using the machine learning model, the response to the oral assessment to determine one or more answers to the written assessment. A machine learning model can identify which parts of an assessee's response correspond to specific questions in a written assessment by using semantic matching and text alignment algorithms that map response segments to question topics and requirements. The model may analyze the semantic content of both the questions and the assessee's response, using techniques such as sentence embeddings, keyword extraction, and topic modeling to identify thematic connections and conceptual overlaps between specific portions of the response and individual assessment items.

In some embodiments, the one or more answers to the written assessment may include one or more selections of the multiple choices to multiple-choice questions. The determined one or more answers may be compared with the one or more selections and matched to the one or more selections when having a threshold similarity. As a result, method 100 may generate a list of the selections to multiple-choice questions using the one or more answers. In some embodiments, when an answer does not match to a selection provided in a multiple-choice question, the answer may be assigned to a "None of the Above" selection, which may be created as a selection for analysis purposes if it were not originally a category in the written assessment.

In some embodiments, the one or more answers may correspond to entries for short-answer questions, fill-in-the-blank questions, essay questions, or other questions for a written assessment.

In block 110, method 100 generates a completed answer form to the written assessment using the one or more answers. The completed answer form may appear identical to or similar to an answer form to the original written assessment. These completed answer forms may increase the acceptance rate by and comfort level of assessors, who may be accustomed to traditional written assessments. For example, the completed answer form may be an optical mark recognition answer sheet (e.g., Scantron form). The optical mark recognition answer sheet may be processed to be scored. As another example, the answer form may include an ordered list of text for answers to fill-in-the-blank or short-answer questions. As another example, the answer form may include the original questions for the written assessment with the answers added. The completed answer form may be in a physical (e.g., paper) form and not only a digital form.

Method 100 may include generating a plurality of completed answer forms for a plurality of assessees. Method 100 may include generating a summary document providing aggregated results of the assessees for the one or more answers. For example, the summary document may include a histogram or other presentations of the statistics related to the aggregated results. The summary document may identify a shortcoming common to multiple questions of the written assessment. The summary document may be generated by a machine learning model analyzing the results.

Method 100 may include analyzing a plurality of response from a plurality of assessees to determine answers that do not correspond to the one or more selections of the multiple choices. These answers may be assigned to a "None of the Above" selection. However, the written assessment may be updated with an updated choice for at least one multiple choice question. For example, the assessees may have responded with an answer more frequently than assessees answered with a given selection in the original written assessment, so that answer may be added to the selections or may replace the given selection in the updated written assessment.

Method 100 may include analyzing an answer of the one or more answers to determine the answer partially matches a correct choice of a multiple-choice question. A machine learning model can determine partial matches between oral answers and the correct multiple-choice selections by employing semantic similarity analysis and content decomposition techniques that break down both the spoken response and the correct selection into constituent knowledge components. The model may use natural language understanding to identify key concepts, facts, and relationships mentioned by the student, comparing these elements against the knowledge components present in the correct multiple-choice option. Through techniques such as cosine similarity on sentence embeddings, named entity matching, and concept overlap analysis, the model may quantify how much of the correct selection's content is reflected in the assessee's oral response, even when expressed in different words or sentence structures. The model can assign partial credit scores based on the percentage of core concepts correctly identified, the accuracy of relationships described, and the presence of supporting details or examples that demonstrate understanding, while also accounting for common misconceptions or alternative valid explanations that might not exactly match the correct selection but still reflect partial knowledge. For a math or science written assessment, the assessee may correctly undertake many steps to arrive at the correct selection but may make a mistake in the last step. In that instance, partial credit may be awarded even when the final answer is incorrect. Method 100 may further include providing a score to the assessee. The score may include partial credit for the multiple-choice question. The ability to provide partial credit for an answer to a multiple-choice question is different from traditional assessments.

Method 100 may include providing a score to the assessee. The assessee may review the score and notice that the grading of the assessment was not fair or was incorrect. For example, the machine learning model may have misinterpreted an oral response from the assessee when the assessee was considering several options, or the assessee may have provided an incorrect answer before settling on the correct answer. The assessee may have the ability to challenge the score. The assessee may identify the question and the relevant portion of the response. The assessee may also provide an explanation of why the score should be changed. The assessee may provide this feedback through a user interface. Method 100 may include receiving feedback from the assessee disputing the score. The feedback may include a bookmark pointing to a portion of the response. In some embodiments, the feedback may be processed through the machine learning model to determine the score is incorrect. The score may be increased. In some embodiments, the feedback may be transmitted to an assessor. The assessor may be a teacher, professor, graduate student, staff, or a person directed by any of those in administering the written assessment. The assessor may review the feedback and decide that the assessee is correct. Method 100 may include receiving an instruction to increase the score from the assessor.

Method 100 may include generating an evaluation document for the assessee. The evaluation document may identify a shortcoming common to multiple incorrect answers. Method 100 may include generating additional questions to test the assessee on a subject area involving the subject. The assessee may improve their knowledge and academic performance through answering these additional questions, which may be evaluated similar to the oral assessment.

Method 100 may update the written assessment so that the median score or other statistical value is closer to a target value. The target value may be a target median or mean score. For example, the assessor may want the grades to be centered on a "B" grade. Method 100 may include calculating a plurality of scores for the written assessment for a plurality of assessees. Calculating the plurality of scores may include analyzing, using the machine learning model, a plurality of responses from the plurality of assessees to the oral assessment. Method 100 may include determining a statistical value of the plurality of scores. Method 100 may include updating the written assessment to generate an updated written assessment having a future plurality of scores so that a future statistical value is closer to a target value than the statistical value is to the target value. Updating the written assessment may include estimating the distribution of correct answers for questions from a test bank. One or more questions from the test bank may be included in the updated written assessment.

A machine learning model may examine the current written assessment data to identify which specific questions contributed most significantly to the observed score distribution, analyzing factors such as question difficulty levels, cognitive load requirements, vocabulary complexity, conceptual depth, and/or common error patterns among assessees. To shift the distribution higher (easier exam), the model may modify questions by simplifying language, reducing the number of steps required for problem-solving, providing additional context or hints, eliminating highly distracting incorrect options in multiple-choice questions, or replacing abstract concepts with more concrete examples that students can more easily grasp. The model may substitute questions having these features. Conversely, to shift the distribution lower (more challenging exam), the model may increase question complexity by introducing multi-step reasoning requirements, using more sophisticated vocabulary, creating more plausible incorrect answer choices, requiring synthesis across multiple concepts, or adding time pressure through more extensive content coverage. The model may substitute questions having these features.

FIG. 2 shows a system 200 for improving educational outcomes. System 200 may perform any or all aspects of method 100.

System 200 may include a camera 208. Camera 208 may be a digital camera. Camera 208 may also capture audio using a microphone. Camera 208 may be directed to capture images and/or audio of the assessee.

Although camera 208 may be a separate component, camera 208 may be part of XR device 210. XR device 210 may be any XR device 210 described herein, including Meta Quest headsets, Apple Vision Pro headsets, Ray-Ban Meta glasses, Meta Orion AI Glasses. In some embodiments, XR device 210 may not include a display for the wearer of XR device 210. In some embodiments, XR device 210 may include a display for the wearer. The display may show a user interface to the assessee. The display may provide questions of the oral assessment or may show objects relevant to the subject matter of questions of the oral assessment. XR device 210 may also include an audio speaker. The questions for the oral assessment may be broadcast using the audio speaker. XR device 210 may be a set of glasses. XR device 210 may show virtual objects, media clips (e.g., film, video), photos, drawings, or other environments during the oral assessment.

System 200 may include an assessee device 202. The assessee device 202 may be a computer system 400. The assessee device 202 may be the device that the assessee is taking an educational assessment on. The assessee device 202 may be running software (e.g., exam software) for the educational assessment. The assessee device 202 may have a display, which may show a user interface for the assessee to take the educational assessment. Assessee device 202 may have a camera and audio speaker, which may be used in the same way as described with XR device 210.

System 200 may include assessor device 212, which may be operated by the assessor associated with administering the educational assessment. Assessor device 212 may be a computer system 400. Assessor device 212 may be used for the assessor to receive results from the educational assessment or to receive feedback from the assessee. Assessor device 212 may access stored responses.

System 200 may include printer 214. Printer 214 may be used to produce completed answer forms.

XR device 210, camera 208, assessee device 202, assessor device 212, and printer 214 may be connected to a network 216.

Server 204 may also be connected to network 216. Server 204 may perform steps described with method 100. Server 204 may include one or more machine learning engines 218. The machine learning engines 218 may be the part of the machine learning model described in method 100. In some embodiments, a single machine learning model may be considered to include several individual machine learning models. Server 204 may include analysis engine 220, which may perform analysis of results, which may not necessarily use a machine learning engine. In some embodiments, the analysis engine 220 may be machine learning engine 218. Server 204 may include user interface engine 222, which is used to update or modify user interfaces in XR device 210, assessee device 202, and/or assessor device 212.

Server 204 may be connected to data store 206, which may be a database, data lake, data mart, or other storage system. Data store 206 may store training data for machine learning models. Data store 206 may also store responses and analysis from method 100.

Server 204 includes a non-transitory computer readable medium storing a plurality of instructions that when executed, cause the processor to perform a method. The method may be method 100 or any method described herein.

System 200 shows a networked server 204. In some embodiments, server 204 may be local and/or may use processing power of XR device 210, assessee device 202, and/or assessor device 212.

Figure 3:
FIG. 3 illustrates analyzing data with machine learning models according to embodiments of the present invention.

FIG. 3 is a block diagram illustrating using one or more machine learning models 301 of a machine learning engine 302 to analyze data to recognize a pattern. The ML engine 302 generates, trains, and uses the ML model(s) 301 based using training data 300. The ML engine 302 trains the ML model(s) 301 to generate an analysis 303 on input of sample data 304 into the ML model(s) 301. The sample data 304 may include data that is extracted from the data stores (e.g., a system that performs the method 100, a data store accessible by server 204, data store 206, a data store accessible by assessee device 202, a data store accessible by assessor device 212, data stores accessible by other devices). In some examples, the sample data 304 may include data that is normalized, merged, and/or processed following extraction (e.g., by any of the systems listed above). In some examples, the sample data 304 may include allocation option results, participant history, and/or modifications (e.g., by any of the systems listed above). In some examples, the sample data 304 may include some preliminary validation data and/or analysis data, such as summary data (e.g., by any of the systems listed above).

The analysis 303 output by the ML model(s) 301 can include at least one pattern identified as part of the analysis 303 of the sample data 304. The pattern can include any type of patterns, for instance including patterns associated with high or low success ratios by participants, types of transactions or merchants favored for methods described herein, and/or types of users frequently requesting allocation options. In some examples, the analysis 303 output by the ML model(s) 301 can include various other elements of analyses described with method 100.

The training data that the ML engine 302 uses to train the ML model(s) 301 includes sample data (e.g., akin to the sample data 304) as well as pre-generated assessment(s) corresponding to the sample data (e.g., akin to the analysis 303 corresponding to the sample data 304). Over the course of the initial training with training data 300, the ML model(s) 301 develop hidden layers between input layers and output layers, and/or weights and/or connections between nodes of the various layers, that each relate to various aspects of the analysis 303, such as any of the aspects described herein (e.g., related to various types of patterns that can be detected and characteristics of those types of patterns).

Once the one or more ML models 301 identify the analysis 303, the analysis 303 (and/or the indication of eligibility of the user account for the modification) can be output to a user (e.g., using a speaker or headphones) and/or to a recipient device that can process and/or put into effect the modification to the client account, for instance by opening a new line or modifying an existing line.

In some examples, the ML engine 302 can continue to train and/or update the ML model(s) 301 over time, for instance based on validation 305 using the analysis 303 and the sample data 304. In some examples, an analysis 306 of the sample data 304 (separate from the analysis 303 generated by the ML model(s) 301) may be provided to the ML engine 302 use in performing the validation 305. In some examples, the analysis 306 may be generated by a different entity than the ML model(s) 301, for instance a different set of ML model(s) (not pictured) or one or more trusted human analysts. If, during validation 305, the ML engine 302 determines that the analysis 303 generated by the ML model(s) 301 matches the analysis 306, the ML engine 302 can treat this as positive feedback, and can perform further training of the ML model(s) 301 based on the analysis 303, the sample data 304, and/or the analysis 306, for instance to strengthen and/or reinforce weights associated with generating the analysis 303 in the ML model(s) 301, and/or to weaken or remove other weights other than those associated with generating the analysis 303, in the ML model(s) 301. If, during validation 305, the ML engine 302 determines that the analysis 303 generated by the ML model(s) 301 differs from the analysis 306, the ML engine 302 can treat this as negative feedback, and can perform further training of the ML model(s) 301 based on the analysis 303, the sample data 304, and/or the analysis 306, for instance to weaken and/or remove weights associated with generating the analysis 303 in the ML model(s) 301, and/or to strengthen and/or reinforce other weights other than those associated with generating the analysis 303 in the ML model(s) 301.

In some examples, the ML engine 302 receives feedback during validation 305 about the analysis 303. The feedback can include a reaction by a user of a user device via a user interface, a reaction by a user determined based on sensor data from a user device, and/or decisions by a user and/or user device as whether or not to use the analysis 303 for a further application. Positive feedback can be used to strengthen and/or reinforce weights associated with generating the analysis 303 in the ML model(s) 301, and/or to weaken or remove other weights other than those associated with generating the analysis 303 in the ML model(s) 301. Negative feedback can be used to weaken and/or remove weights associated with generating the analysis 303 in the ML model(s) 301, and/or to strengthen and/or reinforce other weights other than those associated with generating the analysis 303 in the ML model(s) 301.

The ML engine 302, the ML model(s) 301, and/or the machine learning engine 218 can include one or more neural network (NNs), one or more convolutional neural networks (CNNs), one or more trained time delay neural networks (TDNNs), one or more deep networks, one or more auto-encoders, one or more deep belief nets (DBNs), one or more recurrent neural networks (RNNs), one or more generative adversarial networks (GANs), one or more conditional generative adversarial networks (cGANs), one or more other types of neural networks, one or more trained support vector machines (SVMs), one or more trained random forests (RFs), one or more computer vision systems, one or more deep learning systems, one or more classifiers, one or more transformers, or combinations thereof. Within FIG. 3, a graphic representing the trained ML model(s) 301 is illustrated as a set of circles connected to another. Each of the circles can represent a node, a neuron, a perceptron, a layer, a portion thereof, or a combination thereof. The circles are arranged in columns. The leftmost column of white circles represent an input layer. The rightmost column of white circles represent an output layer. Two columns of shaded circled between the leftmost column of white circles and the rightmost column of white circles each represent hidden layers. The ML engine 302 and/or the ML model(s) 301 can be part of any AI and/or ML modules, processes, or analysis operations discussed herein.

Computing System

Figure 4:
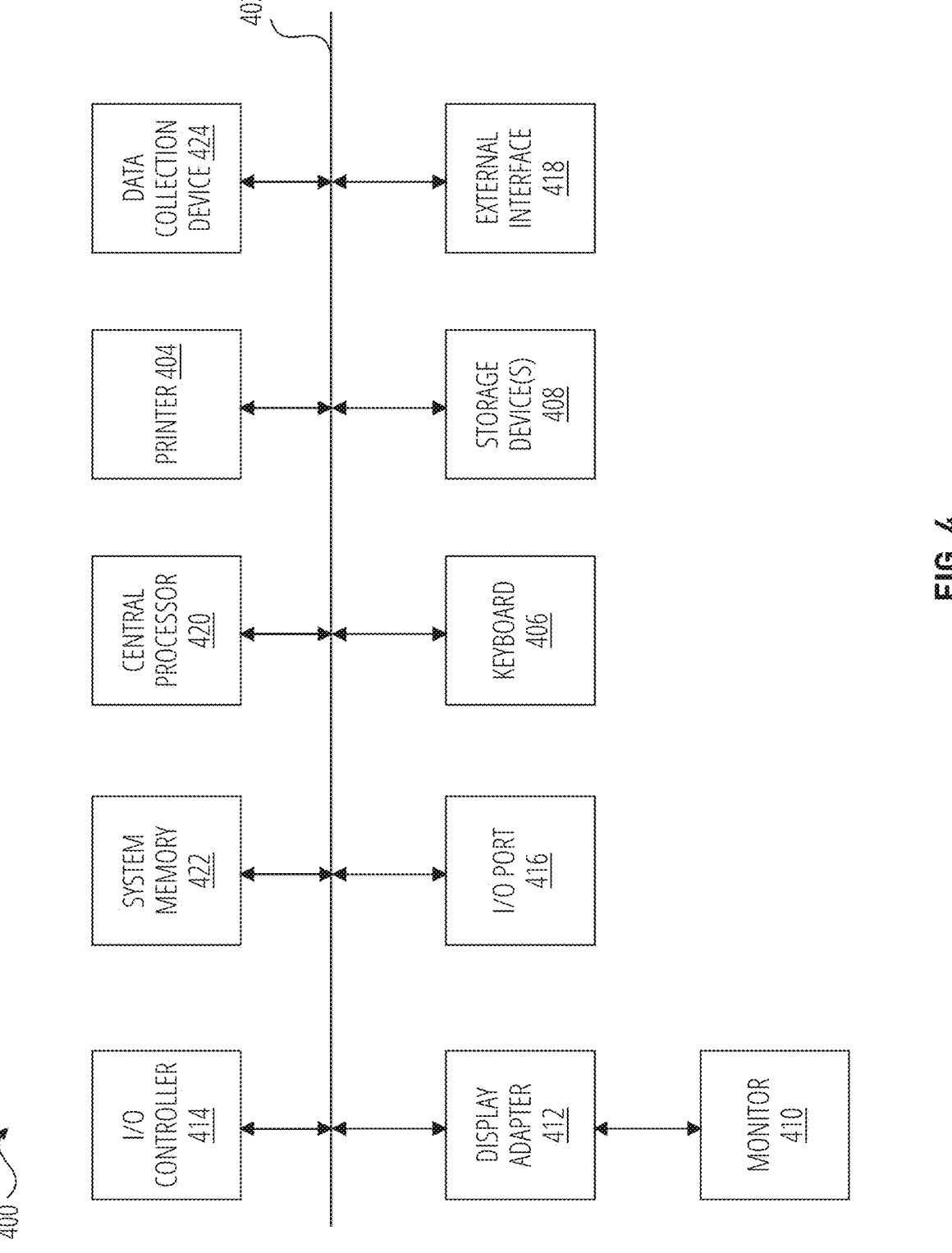
FIG. 4 illustrates an example computing system according to embodiments of the present invention.

Any of the computer systems mentioned herein may utilize any suitable number of subsystems. Examples of such subsystems are shown in FIG. 4 in computer system 400. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones, other mobile devices, and cloud-based systems.

The subsystems shown in FIG. 4 are interconnected via a system bus 402. Additional subsystems such as a printer 404, keyboard 406, storage device(s) 408, monitor 410 (e.g., a display screen, such as an LED), which is coupled to display adapter 412, and others are shown. Peripherals and input/output (I/O) devices, which couple to I/O controller 414, can be connected to the computer system by any number of means known in the art such as input/output (I/O) 416 (e.g., USB, Lightning, Thunderbolt™). For example, i/o port 416 or external interface 418 (e.g. Ethernet, Wi-Fi, etc.) can be used to connect computer system 400 to a wide area network such as the Internet, a mouse input device, or a scanner. The interconnection via system bus 402 allows the central processor 420 to communicate with each subsystem and to control the execution of a plurality of instructions from system memory 422 or the storage device(s) 408 (e.g., a fixed disk, such as a hard drive, or optical disk), as well as the exchange of information between subsystems. The system memory 422 and/or the storage device(s) 408 may embody a computer readable medium. Another subsystem is a data collection device 85, such as a camera, microphone, accelerometer, and the like. Any of the data mentioned herein can be output from one component to another component and can be output to the user.

A computer system can include a plurality of the same components or subsystems, e.g., connected together by external interface 418, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware circuitry (e.g. an application specific integrated circuit or field programmable gate array) and/or using computer software with a generally programmable processor in a modular or integrated manner. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk) or Blu-ray disk, flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order that is logically possible. Additionally, portions of these steps may be used with portions of other steps from other methods. Also, all or portions of a step may be optional. Additionally, any of the steps of any of the methods can be performed with modules, units, circuits, or other means of a system for performing these steps.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

The above description of example embodiments of the present disclosure has been presented for the purposes of illustration and description and are set forth so as to provide those of ordinary skill in the art with a complete disclosure and description of how to make and use embodiments of the present disclosure. It is not intended to be exhaustive or to limit the disclosure to the precise form described nor are they intended to represent that the experiments are all or the only experiments performed. Although the disclosure has been described in some detail by way of illustration and example for purposes of clarity of understanding, it is readily apparent to those of ordinary skill in the art in light of the teachings of this disclosure that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the disclosure being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

The claims may be drafted to exclude any element which may be optional. As such, this statement is intended to serve as antecedent basis for use of such exclusive terminology as "solely", "only", and the like in connection with the recitation of claim elements, or the use of a "negative" limitation.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within embodiments of the present disclosure. The upper and lower limits of these smaller ranges may independently be included or excluded in the range, and each range where either, neither, or both limits are included in the smaller ranges is also encompassed within the present disclosure, subject to any specifically excluded limit in the stated range. Where the stated range includes one or both of the limits, ranges excluding either or both of those included limits are also included in the present disclosure.

All patents, patent applications, publications, and descriptions mentioned herein are hereby incorporated by reference in their entirety for all purposes as if each individual publication or patent were specifically and individually indicated to be incorporated by reference and are incorporated herein by reference to disclose and describe the methods and/or materials in connection with which the publications are cited. None is admitted to be prior art.

What is claimed is:

1. A computer-implemented method of examination, the method comprising:

processing a written assessment through a machine learning model to generate an oral assessment;

transmitting, to an assessee, the oral assessment;

storing a response by the assessee to the oral assessment, wherein the response comprises an audio component;

analyzing, using the machine learning model, the response to the oral assessment to determine one or more answers to the written assessment, wherein analyzing comprises:

converting the response to text, identifying parts of the response that correspond to a question of the written assessment, and analyzing semantic content of the question and the response using sentence embeddings; and generating a completed answer form to the written assessment using the one or more answers.

2. The computer-implemented method of claim 1, wherein:

the written assessment comprises multiple-choice questions, and the one or more answers comprise one or more selections of the multiple choices.

3. The computer-implemented method of claim 2, further comprising:

analyzing a plurality of responses from a plurality of assessees to determine answers that do not correspond to the one or more selections of the multiple choices, and

updating the written assessment with an updated choice for at least one multiple choice question.

4. The computer-implemented method of claim 2, further comprising:

analyzing an answer of the one or more answers to determine the answer partially matches a correct choice of a multiple-choice question, and providing a score to the assessee, wherein the score includes partial credit for the multiple-choice question.

5. The computer-implemented method of claim 1, further comprising:

generating a plurality of completed answer forms for a plurality of assessees, and generating a summary document providing aggregated results of the assessees for the one or more answers.

6. The computer-implemented method of claim 5, wherein the summary document identifies a shortcoming common to multiple questions of the written assessment.

7. The computer-implemented method of claim 1, further comprising:

determining, using the machine learning model, that the response to the oral assessment does not correspond to the one or more answers, and generating one or more follow-up questions to the assessee to elicit a second response corresponding to the one or more answers.

8. The computer-implemented method of claim 1, wherein the machine learning model is configured to generate the oral assessment without disclosing a correct answer.

9. The computer-implemented method of claim 1, further comprising:

storing one or more bookmarks with the response, wherein the one or more bookmarks correspond to a portion of the response used to determine the one or more answers.

10. The computer-implemented method of claim 1, further comprising:

providing a score to the assessee, and receiving feedback from the assessee disputing the score, wherein the feedback comprises a bookmark pointing to a portion of the response.

11. The computer-implemented method of claim 10, further comprising:

processing the feedback through the machine learning model to determine the score is incorrect; and increasing the score.

12. The computer-implemented method of claim 10, further comprising:

transmitting the feedback to an assessor, receiving an instruction to increase the score from the assessor.

13. The computer-implemented method of claim 1, further comprising:

generating an evaluation document for the assessee, wherein the evaluation document identifies a shortcoming common to multiple incorrect answers.

14. The computer-implemented method of claim 13, further comprising:

generating additional questions to test the assessee on a subject area involving the shortcoming.

15. The computer-implemented method of claim 1, wherein the completed answer form is an optical mark recognition answer sheet.

16. The computer-implemented method of claim 1, further comprising:

calculating a plurality of scores for the written assessment for a plurality of assessees, wherein calculating the plurality of scores comprises analyzing, using the machine learning model, a plurality of responses from the plurality of assessees to the oral assessment, determining a statistical value of the plurality of scores, and updating the written assessment to generate an updated written assessment having a future plurality of scores so that a future statistical value of the future plurality of scores is closer to a target value than the statistical value is to the target value by:

estimating distribution of correct answers for questions from a test bank, and including one or more questions from the test bank in the updated written assessment.

17. The computer-implemented method of claim 1, wherein the oral assessment is adapted for an XR device, and the oral assessment includes a virtual object for display in the XR device.

18. The computer-implemented method of claim 1, wherein the machine learning model is trained on datasets of question-answer pairs.

19. A non-transitory computer readable medium storing a plurality of instructions that, once executed by one or more processors, cause the one or more processors to perform a method comprising:

processing a written assessment through a machine learning model to generate an oral assessment;

transmitting, to an assessee, the oral assessment;

storing a response by the assessee to the oral assessment, wherein the response comprises an audio component;

analyzing, using the machine learning model, the response to the oral assessment to determine one or more answers to the written assessment, wherein analyzing comprises:

converting the response to text, identifying parts of the response that correspond to a question of the written assessment, and analyzing semantic content of the question and the response using sentence embeddings; and generating a completed answer form to the written assessment using the one or more answers.

20. A system comprising:

one or more processors; and a non-transitory computer readable medium storing a plurality of instructions that, once executed by the one or more processors, cause the one or more processors to perform a method comprising:

processing a written assessment through a machine learning model to generate an oral assessment;

transmitting, to an assessee, the oral assessment;

storing a response by the assessee to the oral assessment, wherein the response comprises an audio component;

analyzing, using the machine learning model, the response to the oral assessment to determine one or more answers to the written assessment, wherein analyzing comprises:

converting the response to text, identifying parts of the response that correspond to a question of the written assessment, and analyzing semantic content of the question and the response using sentence embeddings; and generating a completed answer form to the written assessment using the one or more answers.

21. The system of claim 20, further comprising a printer.

* * * * *